United States Patent [19]
Inaji et al.

[11] Patent Number: 5,130,620
[45] Date of Patent: Jul. 14, 1992

[54] BRUSHLESS DC MOTOR WITHOUT A POSITION SENSOR

[75] Inventors: Toshio Inaji, Minoo; Kenichi Honjo, Kobe; Makoto Gotou, Nishinomiya, all of Japan

[73] Assignee: Matsushita Electric Industrial Co., Ltd., Osaka, Japan

[21] Appl. No.: 646,548

[22] Filed: Jan. 29, 1991

[51] Int. Cl.$^5$ .............................................. H02P 6/00
[52] U.S. Cl. .................................... 318/254; 318/439
[58] Field of Search .................. 318/254, 254 A, 138, 318/439, 685, 696, 628, 615, 616, 618, 500; 388/804, 805, 811, 816, 817, 911

[56] References Cited

U.S. PATENT DOCUMENTS

| | | | |
|---|---|---|---|
| 4,103,216 | 7/1978 | Hayes | 318/685 |
| 4,119,901 | 10/1978 | Leenhouts | 318/685 |
| 4,220,904 | 9/1980 | Leenhouts et al. | 318/696 |
| 4,429,268 | 1/1984 | Yajima et al. | 318/696 |
| 4,480,218 | 10/1984 | Hair | 318/696 |
| 4,684,866 | 8/1987 | Vehmer et al. | 318/696 |
| 4,780,651 | 10/1988 | Nakano et al. | 318/254 |
| 4,874,993 | 10/1989 | Tanaka et al. | 318/254 |
| 4,928,043 | 5/1990 | Plunkett | 318/254 |
| 4,978,895 | 12/1990 | Schwarz | 318/254 |

FOREIGN PATENT DOCUMENTS

2429217 A1  6/1974  Fed. Rep. of Germany.
62-260586  11/1987  Japan.

OTHER PUBLICATIONS

"Pulsewidth Multiplier Uses Up/Down Counter", Electronic Engineering, Apr. 1984, Great Britain.

Primary Examiner—A. Jonathan Wysocki
Attorney, Agent, or Firm—Wenderoth, Lind & Ponack

[57] ABSTRACT

A full wave drive brushless DC motor system detects zero-crossing points of counter electromotive forces respectively induced by the stator windings, and then pulse-shapes the thus detected zero-crossing points to obtain a pulse signal train, and then measures the thus obtained period of the pulse signal train to determine a conducting phase of the stator windings in response to the thus counted period. The system is thereby capable of supplying an electric current bidirectionally to each of the stator windings without using a position sensor for detecting a position of a rotor.

26 Claims, 15 Drawing Sheets

BRUSHLESS DC MOTOR WITHOUT A POSITION SENSOR

BACKGROUND OF THE INVENTION

1. Field of the Invention

This invention relates to a brushless DC motor and more particularly, to a brushless DC motor which does not have a position sensor for detecting a rotational position of a permanent magnet rotor.

2. Description of the Prior Art

Recently, brushless DC motors have been widely used in industrial or audio and video equipment requiring higher reliability for reasons that service life can be improved as well as noise generation can be reduced resulting from such an advantage that they do not need to have a mechanical contact as would be used in conventional DC motors having a brush.

In order to perform the switching operation of a conducting phase the stator windings of a motor, most of conventional brushless DC motors use a rotor position sensor (such as, for example, a Hall effect sensor) instead of using brushes. However the rotor position sensor is not so cheap, and it requires a sophisticated positional adjustment for setting an increased amount of wiring, so that the cost of conventional brushless DC motors is large as compared with DC motors having brushes.

In addition, some structural limitations will be frequently imposed thereupon for the reason that a rotor position sensor has to be set inside the motor itself. A recent trend is that accompanied with the miniaturization of industrial or audio and video equipment, motors to be used are made small in size and thickness, which means that the sectional space where a rotor position sensor such as the Hall effect is to be provided becomes extremely small. Thus, several types of brushless DC motors having no position sensor such as, for example, the Hall effect sensor have been proposed previously.

Out of which, a brushless DC motor disclosed, for example, in Japanese Laid-Open Patent Application No. 55-160980 is based on the so-called half wave driving method in which an electric current is applied unidirectionally to stator windings of the motor. With this method, electromotive forces induced in two stator windings which are stationary out of three-phase stator windings are detected, and the thus detected signals are operationally processed to determine the next conducting phase so as to supply an electric current unidirectionally to the stator windings in a successive manner.

With this method, however, because the rotor is stationary when starting a motor, no counter electromotive force is generated in each of the stator windings. As a result, in such a brushless DC motor as described above according to the prior art, a starting circuit is specially provided for exciting a specific stator winding to thereby determine the initial point of the rotor in advance. In this case, however, even if only one phase of the stator windings is excited in order to determine the initial position of the rotor as shown above, the position of the rotor oscillates and difficult to stabilize, resulting in an increase in starting time.

In addition, the brushless DC motor according to the prior art is based on the half wave driving method in which an electric current is supplied unidirectionally to its stator windings, so that its driving circuit can be made simple in structure on the one hand, but on the other hand, the utility and efficiency of the stator windings are low as compared with a brushless DC motor based on the full wave driving method in which an electric current is supplied bidirectionally to its stator windings, so that a torque to be developed becomes small.

Japanese Laid-Open Patent Application No. 62-260586 discloses a brushless DC motor which is based on the so-called full wave driving method in which an electric current is supplied bidirectionally to its stator windings. An electric current which flows to its stator windings is switched forcibly and successively when starting by a starting pulse signal outputted from a starting pulse generating circuit to thereby drive the motor. When the rotational speed of the rotor is accelerated and counter electromotive forces are induced in the stator windings, the zero-crossing points of the counter electromotive forces are detected thereby to delay its output signal by a constant period of tim a monostable multi-vibrator, thus determining the conduction timing of the electric current.

With the prior art as described above, the stator windings are subjected the forcible and successive switching operation by a pulse signal outputted from a starting circuit. In this case, however, the rotor becomes oscillatory during rotation. As a result, even when the zero-crossing point of each counter electromotive force can be properly detected, it is difficult for the switching to be properly operated from the starting mode to drive the rotor by switching the stator windings forcibly and successively to the normal position detecting mode by detecting the zero-crossing points of counter electromotive forces induced in the stator windings. That is, the timing of switching from the starting mode to the normal position detecting mode of the rotor is difficult technologically, resulting in an increase in starting time of the motor.

In addition, in a brushless DC motor according to the prior art as described above, the conducting phase is determined by delaying a pulse signal generated at the zero-crossing point of a counter electromotive force induced in each stator winding by a constant period of time through a monostable multi-vibrator. In this case, however, the delay time is constant independent of the rotational speed of the motor, which means that it is not suitable for an application in which the rotational speed has to be changed, thus lacking in flexibility of application.

In these brushless DC motors not having a rotor position sensor as described above, the rotor is generally stationary when starting, and no counter electromotive force is generated in each stator winding. As a result, the conducting phase at the initial stage is not allowed to be determined and such a problem has been further pointed out that they are outstandingly inferior in starting characteristics to DC motors having a rotor position sensor.

Also, these brushless DC motors not having a rotor position sensor are considered as a kind of synchronous motor in that the phase switching is forcibly operated when starting, and the frequency for phase-switching suitable for the starting operation is largely varied depending on the magnitude of a load to be applied to the motor or the inertia of the rotor. In some cases, the zero-crossing point of a counter electromotive force induced in each stator winding may not be allowed to be properly detected eternally, so that such a problem has been further pointed out that the switching operation from the starting mode in which the rotor is driven by switching the stator windings forcibly and successively to the normal position detecting mode in which the rotor is driven by detecting the zero-crossing point of each counter electromotive force is difficult to do properly.

SUMMARY OF THE INVENTION

In consideration of the above-mentioned problems, an object of this invention is to provide a brushless DC motor which has good starting characteristic without using a special starting circuit in spite of no need to use a position sensor.

Another object of this invention is to provide a brushless DC motor of the full wave driving method in which an electric current can be supplied bidirectionally to each of the stator windings thereof.

Further object of this invention is to provide a brushless DC motor whose rotational speed can be changed optionally.

In order to attain the above-mentioned objects, a brushless DC motor in accordance with this invention comprises: a plurality of stator windings a counter electromotive force detecting means for detecting zero-crossing points of counter electromotive forces induced in said plurality of stator windings so as to thereby to obtain a pulse signal train a pulse generating means for measuring a period of the thus obtained pulse signal train and for generating a delay pulse signal delayed by a time proportional or approximately proportional to the thus counted period when the period is within a specific range for generating a pseudo output pulse signal when it exceeds the specific range a logical pulse generating means for generating multi-phase signals in response to an output signal of the pulse generating means, and a power supplying means which receives an output signal from said logical pulse generating means as a position signal of a rotor for supplying electric power to said plurality of stator windings in response to said position signal.

With the above-mentioned structure, a brushless DC motor of this invention pulse-shapes the zero-crossing points of counter electromotive forces respectively induced by a plurality of stator windings to convert them into a pulse signal train. The period of the thus obtained pulse signal train is measured and a position signal of the rotor is generated in response to the thus measured period. As a result, even if the motor changes its rotational speed, no change of the conducting phase of a stator winding to be subsequently conducted results.

Accordingly, a brushless DC motor of this invention can be easily applied for such an application that its rotational speed is required to be changed. This means that such a disadvantage of conventional brushless DC motor not having a rotor position sensor as to becoming unstable in its driving operation when its rotational speed is changed can be eliminated.

In addition, in a brushless DC motor of this invention, even if the counter electromotive force detecting means does not output a pulse signal when starting, it outputs a pseudo pulse signal to switch the conducting phases of the stator windings in a successive manner. As a result, even if a special starting circuit is not provided, a pseudo pulse signal can be easily outputted when starting, and the conducting phases of the stator windings can be switched in a forcible and successive manner by the pseudo pulse signal thus outputted. When the counter electromotive force detecting means detects zero-crossing points of the counter electromotive forces, the switching can be rapidly operated from the starting mode to drive the rotor by switching the stator windings forcibly and successively to the normal position detecting mode by detecting the zero-crossing points of counter electromotive forces induced in the stator windings, thus obtaining a starting characteristic compatible with that obtained in conventional motors having a rotor position sensor.

In addition, since it is unnecessary to use a rotor position sensor as would be used in conventional brushless DC motors, a brushless DC motor of this invention makes it possible to eliminate a sophisticated setting position adjustment of the sensor as well as to reduce the number of wirings, resulting in a vast reduction in cost.

Further in addition, since it is unnecessary to provide a rotor position sensor into the motor, no structural limitation can be imposed thereupon, largely contributing to the possibility of making it small in size and thickness.

Still further in addition, with the above-mentioned structure, the counter electromotive force detecting means detects only zero-crossing points of counter electromotive forces induced in the stator windings, so that in spite of no need to use a position sensor such as a Hall effect sensor, a brushless DC motor of this invention can supply an electric current bidirectionally to each stator winding, meaning that a brushless DC motor based on the full wave driving method can be easily provided. As a result, as compared with a motor based on the half wave driving method in which an electric current is supplied unidirectionally to each stator winding, a motor which outstandingly superior in utility and efficiency of stator windings as well as in torque to be developed can be provided.

DESCRIPTION OF THE PREFERRED EMBODIMENTS

Figure 1:
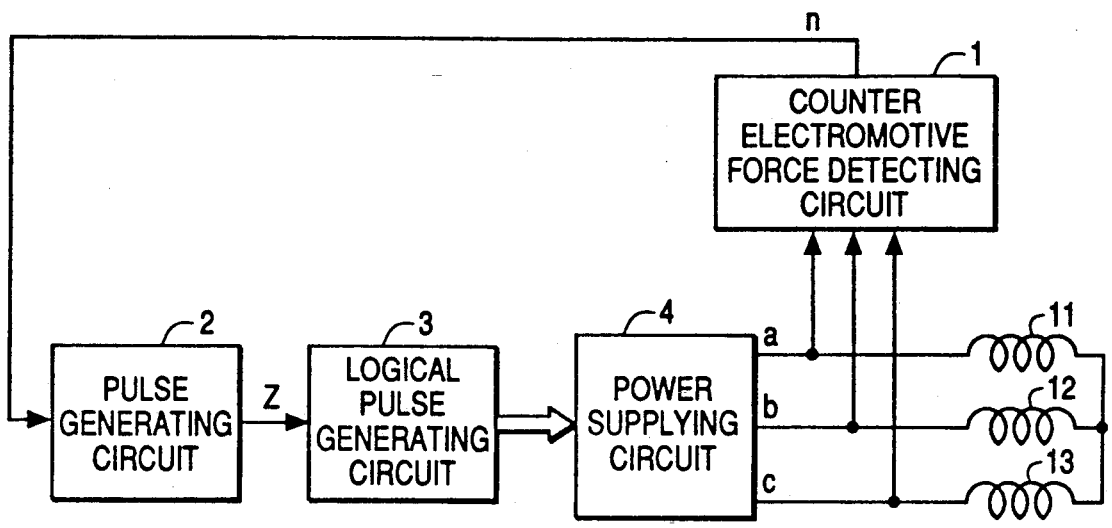
FIG. 1 is a block diagram of a brushless DC motor in accordance with one embodiment of this invention.

Preferred embodiments of this invention will be described below while referring to the drawings.

FIG. 1 is a block diagram of a brushless DC motor in accordance with one embodiment of this invention. In FIG. 1, element 1 is a counter electromotive force detecting circuit to receive counter electromotive forces respectively induced in three-phase stator windings 11, 12 and 13. The counter electromotive force detecting circuit 1 detects respective zero-crossing points of the three-phase counter electromotive forces to convert them into a pulse train n. The pulse train n shows the zero-crossing point of each of the three-phase counter electromotive forces thus induced in the stator windings 11, 12 and 13. The pulse train n outputted from the counter electromotive force detecting circuit 1 is inputted to a pulse generating circuit 2. The pulse generating circuit 2 first measures a period of the pulse train n thus inputted and delays it by a period of time approximately equal to half the period thus measured. The reference numeral 3 indicates a logical pulse generating circuit for frequency-dividing a pulse signal z outputted from the pulse generating circuit 2 and for outputting six-phase pulse signals having the same frequency as that of the counter electromotive forces induced in the stator windings 11, 12 and 13. The six-phase pulse signals generated through the logical pulse generating circuit 3 become a position signal of a rotor and are sent to a power supplying circuit 4. The power supplying circuit 4 supplies an electric current bidirectionally to each of the stator windings 11, 12 and 13 in a successive manner in response to a position signal outputted from the logical pulse generating circuit 3.

With the structure shown above, the operation of a brushless DC motor of this embodiment will be explained in detail below.

Figure 2:
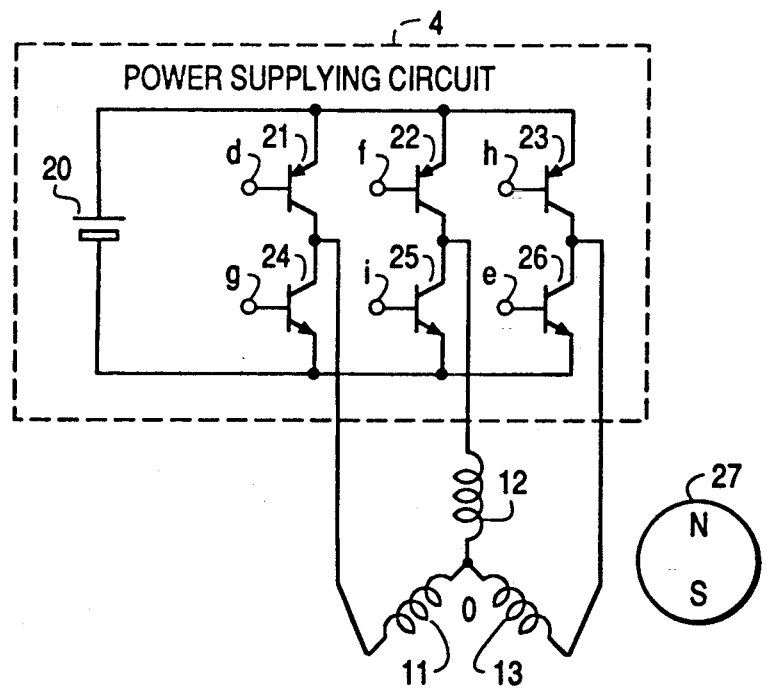
FIG. 2 is a circuit diagram of a motor and a power supplying circuit for supplying a power to stator windings thereof shown in FIG. 1.
Figure 3:
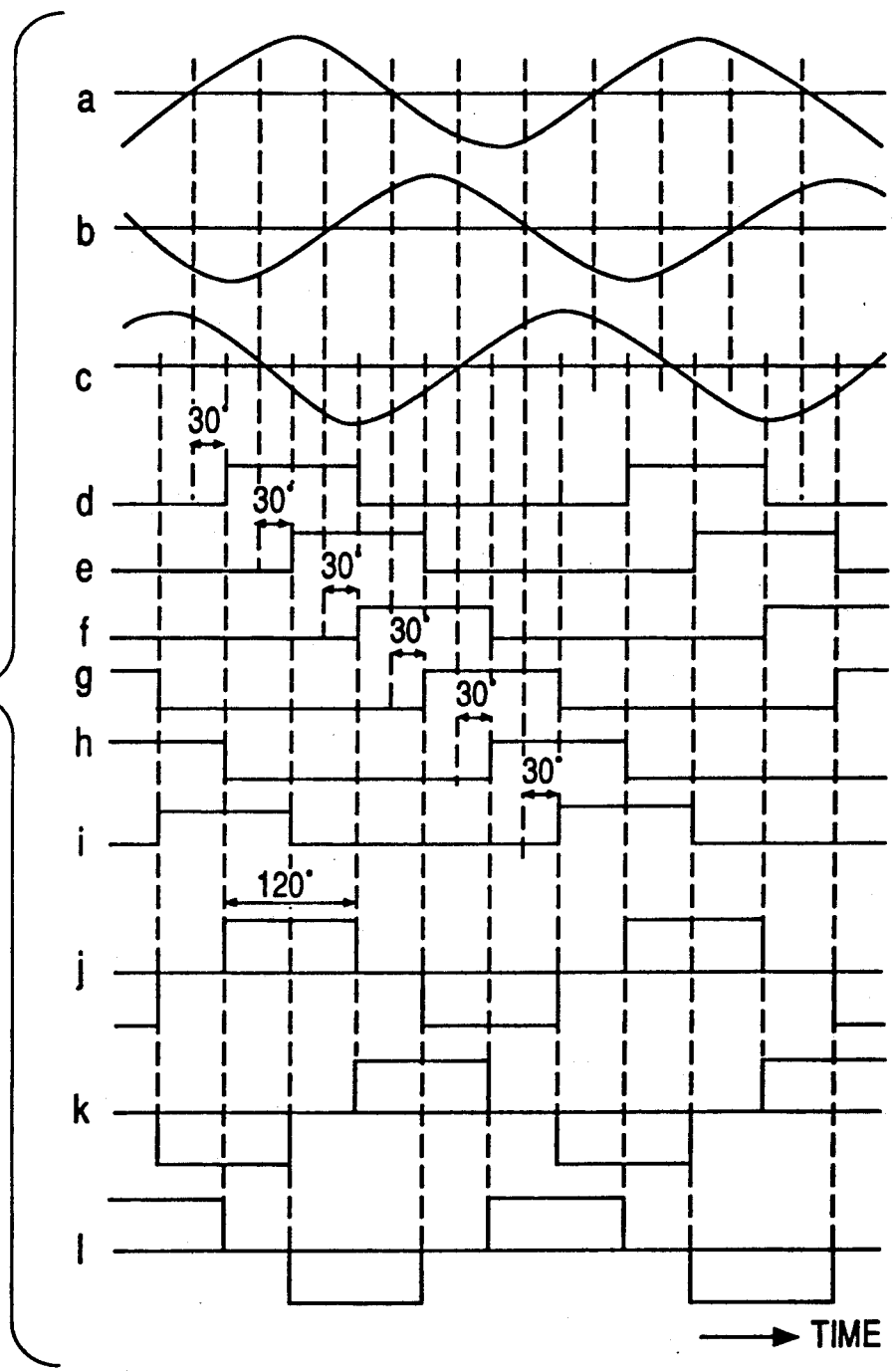
FIG. 3 is a diagram showing a signal waveform outputted from each member of the circuit shown in FIG. 2.

FIG. 2 is a circuit diagram of a motor and a power supplying circuit 4 shown in FIG. 1 The signal waveform outputted from each member of the circuit shown in FIG. 2 is shown in FIG. 3.

In FIG. 2, element 27 is a permanent magnet, rotor, elements 11, 12 and 13 are each a stator winding, and elements 21, 22, 23, 24, 25 and 26 are each a driving transistor for supplying an electric power to each of the stator windings 11, 12 and 13 based on an ON-OFF operation. Of these driving transistors, 21, 22 and 23 are PNP transistors and 24, 25 and 26 NPN transistors. The reference numeral 20 indicates a power source. A brushless DC motor is generally driven by supplying the six-phase pulse signals obtained through the pulse generating circuit 2 in response to a position signal of the rotor 27 respectively to the bases of the driving transistors 21, 22, 23, 24, 25 and 26. Waveforms of these six-phase pulse signals are shown in FIGS. 3d, e, f, g, h and i. In this case, however, the PNP transistors 21, 22 and 23 each is supplied with the pulse signal to its base in the direction that an electric current is to be output and on other hand the NPN transistors 24, 25 and 26 each is supplied with a pulse signal to its base in the direction that an electric current input is to be. First, the transistors 21 and 25 conduct to cause an electric current to flow to the stator windings 11 and 12. Next, the transistors 21 and 26 conduct to cause an electric current to flow to the stator windings 11 and 13. Such a phase switching operation is carried out in a successive manner so as to thereby rotate the permanent magnetic rotor 27. In this case, electric currents as shown in FIGS. 3j, k and l are supplied bidirectionally to the stator windings 11, 12 and 13. Also, under the rotational condition of the permanent magnet rotor 27, at terminals of the stator windings 11, 12 and 13 are induced voltages (counter electromotive forces) as shown in FIGS. 3a, b and c, respectively. Each of six-phase pulse signals as shown at d, e, f, g, h and i of FIG. 3 shows a position signal of the rotor 27 and respectively have phase relationships as shown in FIG. 3 with waveforms of the counter electromotive forces a, b and c. In this case, note that the rising edge of each position signal is delayed in phase by 30° in terms of electrical angle from the zero-crossing point of a corresponding one of the counter electromotive forces a, b and c. As a result, in order to rotationally drive a permanent magnet rotor without using a rotor position sensor such as a Hall effect sensor as in this invention, a signal processing such that zero-crossing points of counter electromotive forces a, b and c respectively induced in the stator windings 11, 12 and 13 are detected thereby delay to make its output pulse, signal by 30° in terms of electrical angle becomes necessary.

Explanations will be further made on the signal processing operation of each member of this embodiment.

Figure 4:
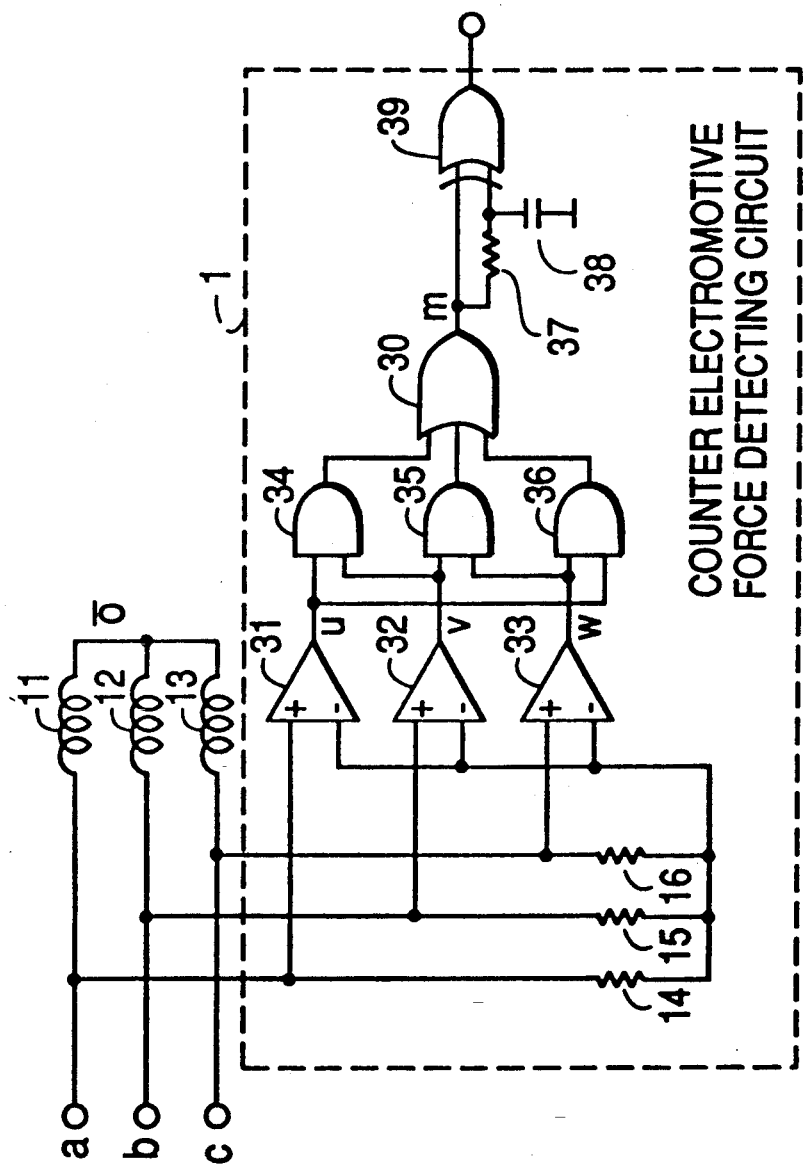
FIG. 4 is a circuit diagram of a counter electromotive force detecting circuit shown in FIG. 1.

FIG. 4 is a circuit diagram of a counter electromotive force detecting circuit 1 shown in FIG. 1.

In FIG. 4, elements 14, 15 and 16 are each a resistor whose one terminal is connected to a corresponding one of the stator windings 11, 12 and 13 and whose other terminal is connected to a common connecting point elements 31, 32 and 33 are each a comparator whose one input terminal (+) is connected to a corresponding one of the stator windings 11, 12 and 13 and whose other input terminal (−) is connected to the common connecting point of the resistors 14, 15 and elements 16, and 34, 35 and 36 are each indicates an AND circuit. The AND circuits 34, 35 and 36 are connected at their input terminals to output terminals of the comparators 31 and 32, the comparators 32 and 33, and the comparators 33 and 31, respectively. Each of outputs from the AND circuits 34, 35 and 36 is inputted to an OR circuit 30. An exclusive OR circuit 39 receives at one input terminal thereof a signal directly outputted from the OR circuit 30 and receives at the other input terminal thereof a signal obtained by delaying the output signal from the OR circuit 30 by a time constant specified by a resistor 37 and a capacitor 38.

Figure 5:
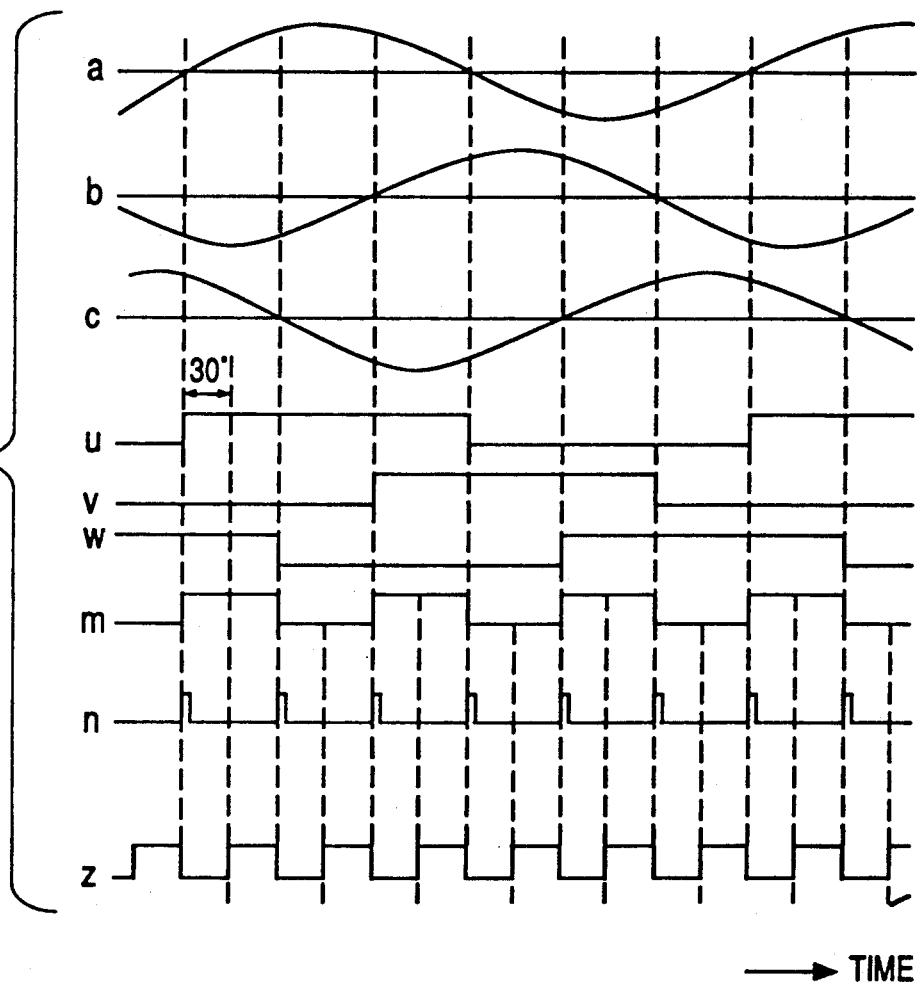
FIG. 5 is a diagram showing a signal waveform outputted from each member of the circuit shown in FIG. 4.

The operation of the counter electromotive force detecting circuit 1 shown in FIG. 4 will be explained by referring to FIG. 5.

The resistors 14, 15 and 16 in FIG. 4 are respectively connected to the stator windings 11, 12 and 13, so that the same electric potential as that of the neutral point 0 of the stator windings 11, 12 and 13 can be obtained at the common connecting point of the resistors 14, 15 and 16. As a result, as the motor, there is no need to take out a signal line specifically from the neutral point of the stator windings 11, 12 and 13. Counter electromotive forces a, b and c respectively induced in the stator windings 11, 12 and 13 are respectively inputted to input terminals (+) of the comparators 31, 32 and 33, and the electric potential of the neutral point of the stator windings 11, 12 and 13 obtained at the common connecting point of the resistors 14, 15 and 16 is inputted to the input terminals (−) of them. Thus, at terminals of the comparators 31, 32 and 33, pulse signals having waveforms as shown in FIGS. 5$u$, $v$ and $w$ can be respectively obtained by waveform-shaping the counter electromotive forces a, b and c thereby coinciding the pulse edges thereof with the zero-crossing points of the counter electromotive forces a, b and c. The waveform of an output signal from the OR circuit 30 as a member of the counter electromotive force detecting circuit 1 is shown in FIG. 5$m$, which has a pulse train having rising and falling pulse edges coincident with the zero-crossing points of three-phase counter electromotive forces a, b and c. FIG. 5$n$ shows a waveform of a signal obtained by differentiating both edges of the output signal m of the OR circuit 30. That is, the exclusive OR circuit 39, the resistor 37 and the capacitor 38 make a circuit for differentiating both edges of a pulse, in which the exclusive OR circuit 39 outputs a pulse signal at the zero-crossing point of each of three-phase counter electromotive forces a, b and c thereby output a pulse train having six pulses (each differing by 60° in terms of electrical angle) per period of each of the counter electromotive forces a, b and c. FIG. 5$z$ shows an output signal of the pulse generating circuit 2, which has a pulse signal waveform whose rising edge is delayed by 30° in terms of electrical angle after detection of the timing of the rising edge of the pulse train shown in FIG. 5$n$.

Next, the operation of the pulse generating circuit 2 shown in FIG. 1 will be explained in detail.

Figure 6:
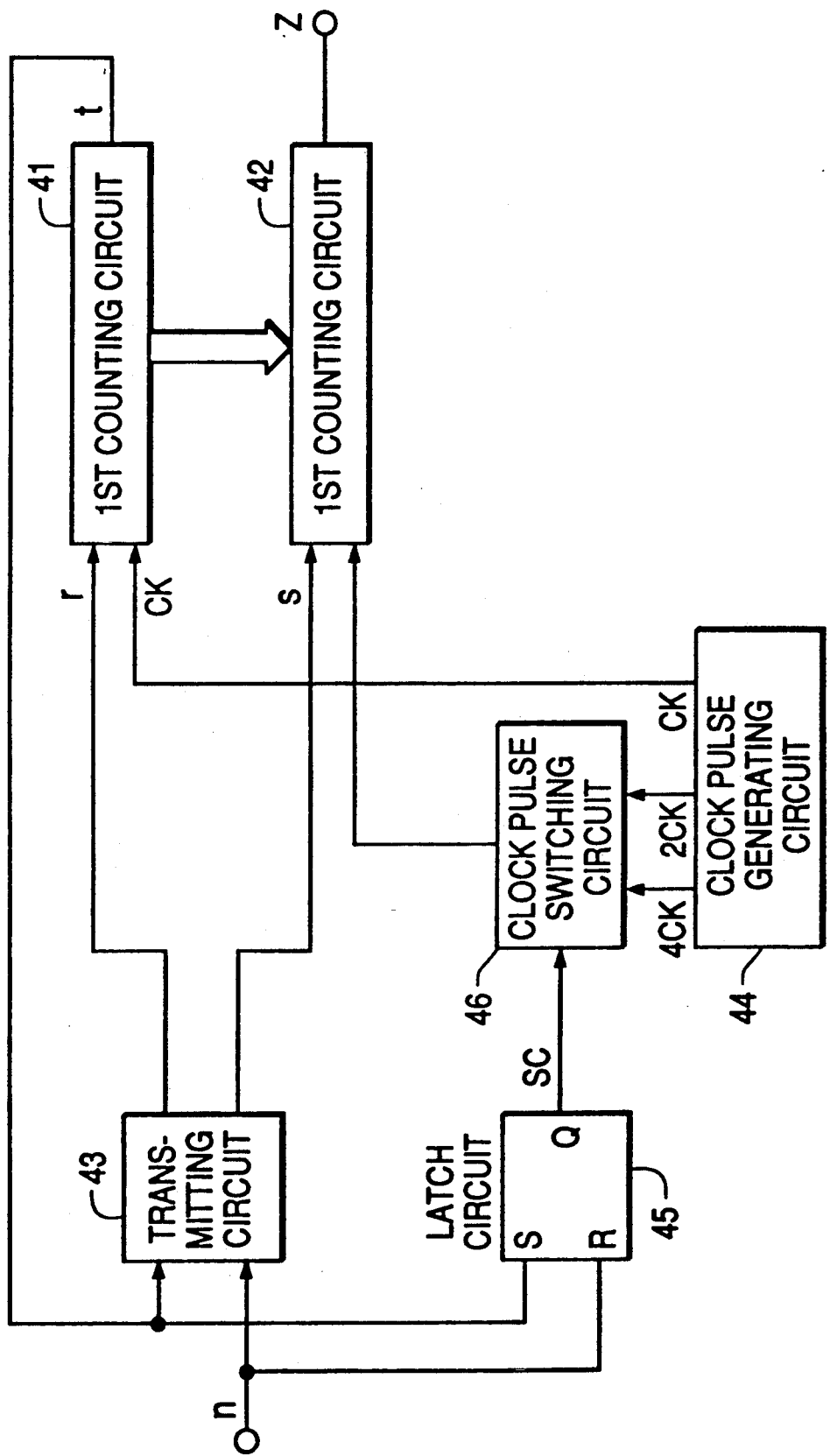
FIG. 6 is a block diagram of a pulse generating circuit showing an example of that shown in FIG. 1.
Figure 7:
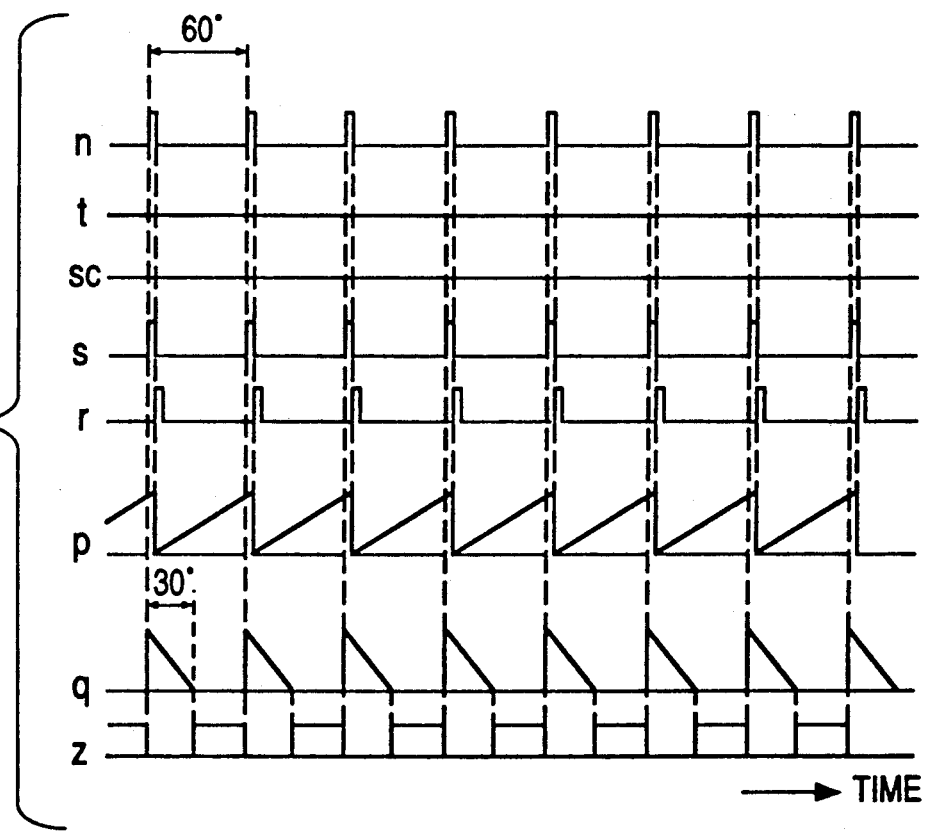
FIG. 7 is a diagram showing a signal waveform outputted from each member of the circuit shown in FIG. 6 when rotating stationarily.
Figure 8:
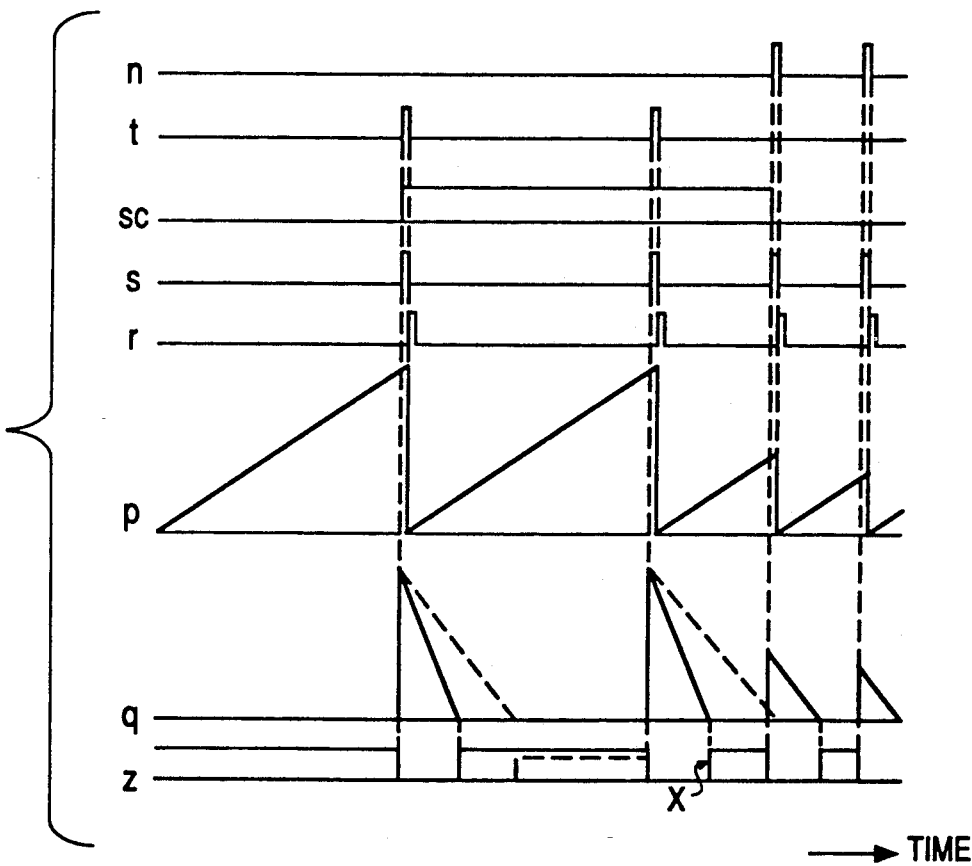
FIG. 8 is a diagram showing a signal waveform outputted from each member of the circuit shown in FIG. 6 when starting.

FIG. 6 is a block diagram of a pulse generating circuit showing an example of the pulse generating circuit 2 in FIG. 1. The waveform of an output signal from each member of the circuit shown in FIG. 6 when a motor is being normally rotated is shown in FIG. 7 and that when it is to be started is shown in FIG. 8.

In FIG. 6, element 41 is indicates a first counting circuit, element 42 is does a second counting circuit element 44 is a clock pulse generating circuit. The first counting circuit 41 outputs a carry flag signal t when its count value is overflows, and the second counting circuit 42 outputs a zero flag signal z when its count value becomes zero. Element 43 is indicates a transmitting circuit for receiving the pulse train n outputted from the counter electromotive force detecting circuit 1 and the pulse signal t outputted from the first counting circuit 41. The transmitting circuit 43 outputs a reset pulse r to the first counting circuit 41 for resetting the count value thereof and a load pulse S to the second counting circuit 42 for loading the count value of the first counting circuit 41. Element 45 is indicates a latch circuit having a set terminal S for inputting the pulse signal t outputted from the first counting circuit 41, a reset terminal R for inputting the pulse train n outputted from the counter electromotive force detecting circuit 1 and an output terminal Q for outputting a switching signal sc to a clock pulse switching circuit 46. A clock pulse generating circuit 44 generates three kinds of clock pulses, ck, 2ck and 4ck, out of which the clock pulse ck is inputted to the first counting circuit 41, and the clock pulses 2ck and 4ck (meaning that their clock frequencies are respectively twice and quadruple that of the clock pulse ck) are inputted to the clock pulse switching circuit 46. The clock pulse switching circuit 46 selects either clock pulse 2ck or 4ck in response to the inputted switching signal sc thereby outputting it to the second counting circuit 42 as a clock pulse signal.

The operation of the pulse generating circuit shown in FIG. 6 when a motor is being rotated normally will be explained by referring to FIG. 7. As shown in FIGS. 7$n$ and $t$, the counter electromotive force detecting circuit 1 outputs a pulse train n of a constant interval and the first counting circuit 41 does not output the pulse signal t, so that an output signal from the Q output terminal of the latch circuit 45 can be reset and the switching signal sc is allowed to remain an "L" (low level) as shown in FIG. 7. When the switching signal sc an "L", the clock pulse switching circuit 46 is made to select the clock pulse 2ck to thereby send it to the second counting circuit 42. The first counting circuit 41 continues to count up the clock pulse 2ck until the reset pulse r outputted from the transmitting circuit 43 is received. Since the reset pulse r has the same frequency as that of the pulse train n outputted from the counter electromotive force detecting circuit 1, the count value of the first counting circuit 41 results in counting the period of the pulse train n outputted from the counter electromotive force detecting circuit 1. Such a state as shown above is shown in FIG. 7$p$. The count value p of the first counting circuit 41 is transmitted to the second counting circuit 42 as an initial value at the timing of the load pulse s outputted from the transmitting circuit 43. The second counting circuit 42 down the count value p obtained by counting the period of pulse train n with the clock pulse of 2ck, so that the count value can be made zero at the middle point of the pulse train of the load pulse s (or the rising edge of the pulse train n). Such a state as shown above is shown in FIG. 7$q$. The second counting circuit 42 is made to output a zero flag signal when the count value is zero, so that it can output a delay pulse signal z as shown in FIG. 7$z$. Rising edges of the pulse train n outputted from the counter electromotive force detecting circuit 1 indicate zero-crossing points of the counter electromotive forces a, b and c respectively induced in the stator windings 11, 12 and 13, so that the interval of the pulse train s outputted at rising edges of the pulse train n is equivalent to the electrical angle of 60°. As a result, the pulse signal z shown in FIG. 7 has rising edges just delayed by 30° in terms of electrical angle from zero-crossing points of the counter electromotive forces a, b and c and are outputted as a delayed pulse signal to the logical pulse generating circuit 3. In addition, between the phase of the load pulse signal s and that of the reset pulse signal r, there exists a relationship as shown in FIG. 7. The fact that the reset pulse r is delayed in phase from the load pulse s is to make sure of transmitting the count value of the first counting circuit 41 to the second counting circuit 42. Also, referring to the drawings, a pulse width of each of the pulses r and s is made large for the sake of convenience, it is sufficiently small as compared with the pulse period.

Next, the operation of the pulse generating circuit 2 when a motor is to be started will be explained by referring to FIG. 8. The first counting circuit 41 continues to count up the clock pulse ck until the reset pulse r outputted from the transmitting circuit 43 is received. In this case, however, the rotor remains stationary, so that the counter electromotive force detecting circuit 1 does not output the pulse train n. As a result, the count value of the first counting circuit 41 is increased as shown in FIG. 8p and when the count value overflows, the first counting circuit 41 outputs a pulse signal t to the transmitting circuit 43 and the latch circuit 45. The transmitting circuit 43 receives the pulse signal t and outputs the reset pulse signal r and load pulse signal s. The pulse signal t is inputted to the set terminal s of the latch circuit 45, so that the switching signal sc outputted from the latch circuit 45 becomes an "H" (high level) as shown in FIG. 8sc. When the switching signal sc becomes "H", the clock pulse switching circuit 46 is made to select the clock pulse 4ck from the clock pulse generating circuit 44 to thereby send it to the second counting circuit 42. The second counting circuit 42 loads, the initial value with the load pulse s and counts down the count value and when the count value thus counted down become zero, outputs a pulse signal z as a zero flag. The pulse signal z shown in FIG. 8 is equivalent to a pseudo output pulse signal when the motor is started and sent to the logical pulse generating circuit 3. When the motor is to be started, the counter electromotive force detecting circuit 1 does not output the pulse train n and the phase signal t performs the phase switching operation of the stator windings 11, 12 and 13. As a result, the permanent magnet rotor 27 of the motor starts to rotate by the pseudo output pulse z outputted from the pulse generating circuit 2. When the pulse train n as shown in FIG. 8 is outputted from the counter electromotive force detecting circuit 1, the latch circuit 45 is reset by the pulse train n thus outputted and the switching signal sc outputted therefrom becomes an "L". In this case, however, if the second counting circuit 42 is made to count down the inputted clock pulse which remains as 2ck, the count value obtained through the second counting circuit 42 becomes as shown by the dotted line in FIG. 8q. As is clear from the waveform shown by the dotted line in FIG. 8q, when the motor is to be started, before the second counting circuit 42 counts down the clock pulse and the count value becomes zero, such a case in which the count value of the first counting circuit 41 is further transmitted thereto may happen. In such a case, the count value of the second counting circuit 42 does not become zero, thus the pulse signal z is not outputted. Accordingly, a pulse x as shown in FIG. 8 z is not generated, so that the phase switching operation between the stator windings 11, 12 and 13 can not be carried out properly and smooth acceleration of the motor cannot be expected.

Then, if the pulse generating circuit 2 is structured such that when the transmitting circuit 43 receives the pulse signal t, a clock pulse outputted from the clock pulse switching circuit 46 to the second counting circuit 42 is switched from 2ck to 4ck, the initial value sent to the second counting circuit 42 is down-counted with the clock pulse of 4ck. Thus, the count value will become zero in a time which is half that obtained when down-counted with the clock pulse of 2ck. This is shown by the continuous line in FIG. 8q. As a result, the above-mentioned case that the count value of the first counting circuit 41 is further transmitted to the second counting circuit 42 before the count value thereof becomes zero does not happen. This means that as the waveform shown by the continuous line in FIG. 8q, the count value of the second counting circuit 42 surely becomes zero thereby outputting the pulse signal z. Then, the second counting circuit 42 outputs the pulse signal z as shown in FIG. 8z under the same operational condition as in the normal rotation of the motor explained above. The pulse signal is sent to the logical pulse generating circuit 3 and through the power supplying circuit 4, the conducting phase switching between the three-phase stator windings 11, 12 and 13 is operated in a successive manner. Thus, the motor is smoothly accelerated, resulting in obtaining a good starting characteristic.

In addition, in the pulse generating circuit shown in FIG. 6 as one embodiment of this invention, the clock signal to be inputted to the second counting circuit has a frequency twice that to be inputted to the first counting circuit, but it may be of an integer multiple thereof.

Figure 9:
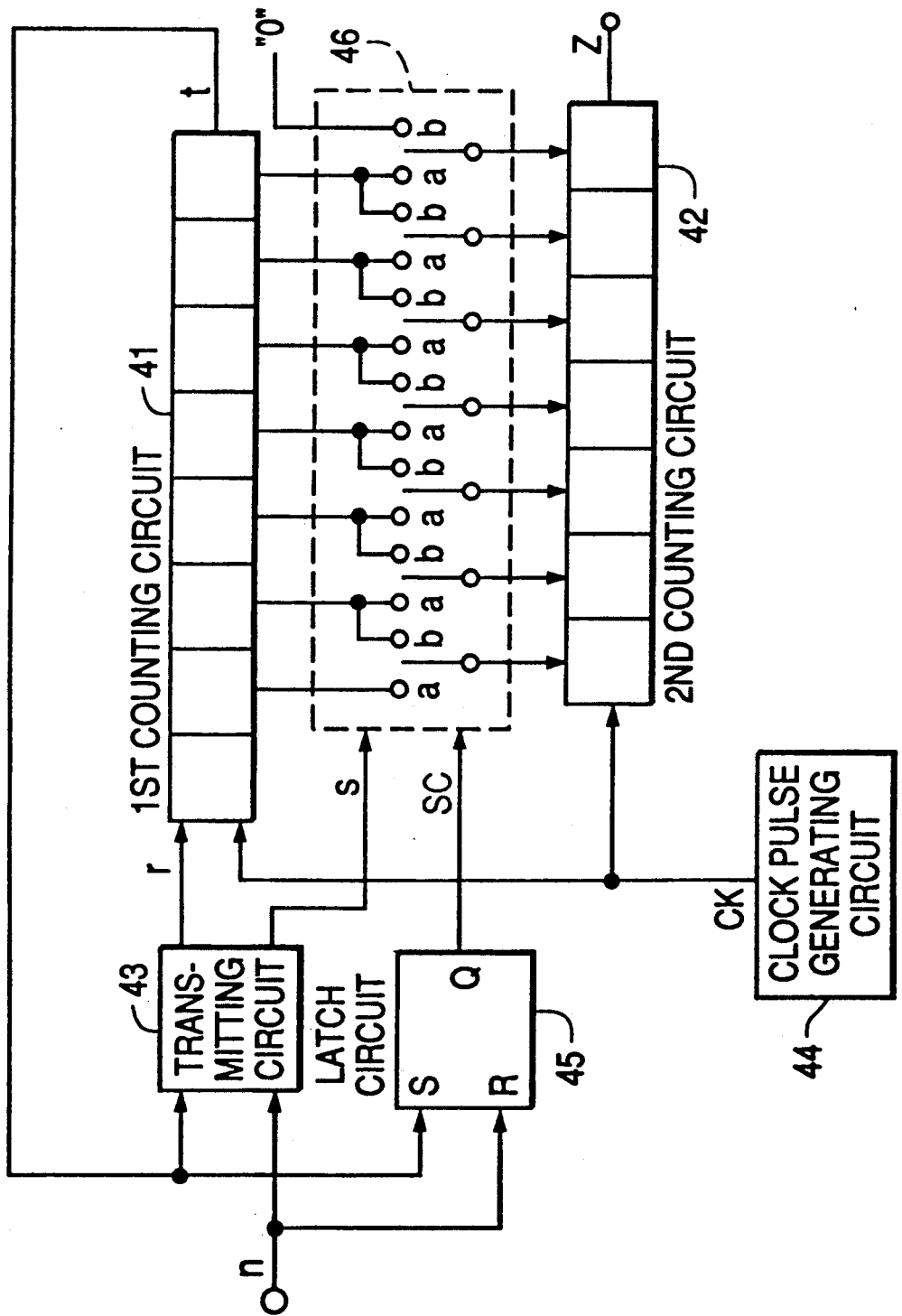
FIG. 9 is a block diagram of a pulse generating circuit showing another example of that shown in FIG. 1.
Figure 10:
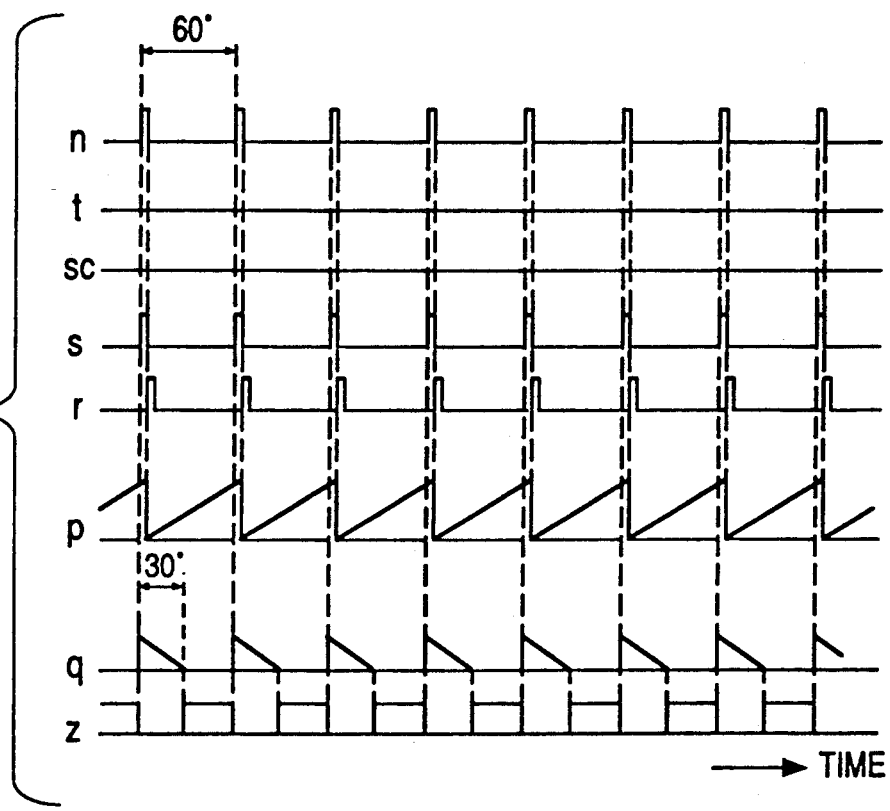
FIG. 10 is a diagram showing a signal waveform outputted from each member of the circuit shown in FIG. 9 when rotating stationarily.
Figure 11:
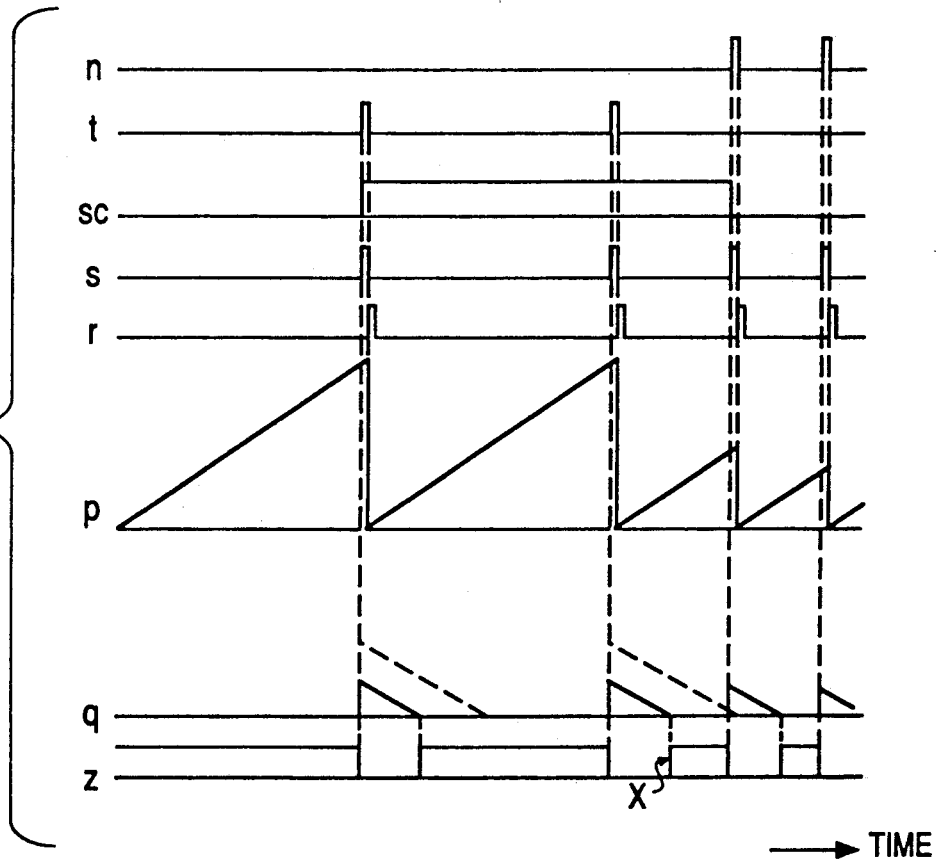
FIG. 11 is a diagram showing a signal waveform outputted from each member of the circuit shown in FIG. 9 when starting.

FIG. 9 is a block diagram of a pulse generating circuit showing another example of the pulse generating circuit 2 shown in FIG. 1. The waveform of an output signal from each member of the circuit shown in FIG. 9 when a motor is being rotated normally is shown in FIG. 10 and that when it is to be started is shown in FIG. 11.

In this case, members having the same functions as those of members shown in FIG. 6 have the same reference numerals and their explanations are omitted for the sake of eliminating duplication.

In FIG. 9, a first counting circuit 41 is an eight-bit digital counter and a second counting circuit 42 is a seven-bit digital counter. The first counting circuit 41 and second counting circuit 42 have the same clock ck inputted. Element 46 is a switch transmitting circuit made of seven switches and connected to either contact point a or b for only a small period of time by a load pulse s outputted from a transmitting circuit 43. Also, to the switch transmitting circuit 46 is inputted a switching signal sc from a latch circuit 45, and when the load pulse s is inputted under such a state that the switching signal sc is an "L", the switch transmitting circuit 46 is connected to the contact point a, and when it is inputted under such a state that it is an "H", it is connected to the contact point b. When the switch transmitting circuit 46 is in the connection with the contact point a, bits excepting the least significant bit of the count value of the first counting circuit 41 (the upper 7 bits in an example shown in FIG. 9) are sent to the second counting circuit 42. Also, when the switch transmitting circuit 46 is connected to the contact point b, bits excepting 2 bits from the least significant bit of the count value of the first counting circuit 41 (the upper 6 bits in the example shown in FIG. 9) are sent to the second counting circuit 42 and to the most significant bit of the second counting circuit 42 is sent a "0".

The operation of the pulse generating circuit shown in FIG. 9 when a permanent magnet rotor 27 is being normally rotated will be explained by referring to FIG. 10.

When a motor is under the normal rotational condition, a Q output signal of the latch circuit 45 is reset and the switching signal sc remains as an "L" as shown in FIG. 10. As a result, the switch transmitting circuit 46 is connected to the contact point a when the load pulse s is inputted, so that bits excepting only the least significant bit of the count value p of the first counting circuit 41 are transmitted to the second counting circuit 42. As a result, as shown in FIG. 10q, a value half the count value p of the first counting circuit 41 is fed to the second counting circuit 42 as the initial value. Thus, the second counting circuit 42 counts down the value of p/2 equivalent to the half of the count value obtained by counting the frequency of a pulse train n with the clock pulse of ck, so that the count value becomes zero at the middle point of the pulse train of the load pulse s (or at the rising edges of the pulse train n). Such a state is shown in FIG. 7q. The second counting circuit 42 outputs a zero flag signal when the count value becomes zero thereby outputting a delay pulse as shown in FIG. 10z.

Next, the operation of the pulse generating circuit shown in FIG. 9 when a motor is to be started will be explained below by referring to FIG. 11. When it is started, the counter electromotive force detecting circuit 1 does not output the pulse train n and the first counting circuit 41 continues to count up the clock pulse ck. As a result, the count value of the first counting circuit 41 is increased as shown in FIG. 11p, and when it overflows, the first counting circuit 41 outputs a carry flag signal t to send it to the transmitting circuit 43 and the latch circuit 45. Thus, an output signal from the latch circuit 45 becomes an "H" as shown in FIG. 11 sc. If the load pulse s is inputted under such state, the switch transmitting circuit 46 is connected to the contact point b. Thus, to the second counting circuit 46 are sent bits excepting only 2 bits from the least significant bit of the count value p of the first counting circuit 41. So sent that as shown by the continuous line in FIG. 11q, a value quarter the count value p of the first counting circuit 41 (the upper 6 bits) is fed to the second counting circuit 42 as the initial value. In this case, however, suppose that as shown by the dotted line in FIG. 11q, when the transmitting circuit 43 receives the pulse signal t, the value of p/2 (upper 7 bits) which is half the count value of the first counting circuit 41 is sent directly to the second counting circuit 42. Then, as it clear from the waveform shown by the dotted line in FIG. 11q, when the motor is started, before the second counting circuit 42 counts down the initial value of p/2 to obtain its count value of zero, the count value of the first counting circuit 41 may be further sent to the second counting circuit 42. In such a case, the count value of the second counting circuit 42 does not become zero so as to thereby not output the delay pulse z. As a result, a pulse x as shown in FIG. 11z is not generated. Therefore, the phase switching operation cannot be properly carried out between the stator windings, which means that smooth acceleration of the motor cannot be expected. So, when the transmitting circuit 43 receives the carry flag signal t when starting, the value of p/2 which is half value of the count value of the first counting circuit 41 (in this case, the upper 7 bits of the first counting circuit 41) is not sent directly to the second counting circuit 42, but the switch transmitting circuit 46 is connected to the contact point b for a short period of time during transmission. Thus, the value of p/4 which is one quarter the count value of the first counting circuit 41 (in this case, the upper 6 bits of the first counting circuit 41) is sent to the second counting circuit 42, which is shown by the continuous line in FIG. 11q. As a result, the transmission of the count value of the first counting circuit 41 to the second counting circuit 42 before the count value of the second counting circuit 42 becomes zero does not happen. This means that the second counting circuit 42 surely becomes zero and outputs the zero flag signal z as a delay pulse signal when the count value becomes zero. Then, the second counting circuit 42 outputs the delay, pulse signal z as shown in FIG. 11z in the same fashion as in case that the motor is being normally rotated. The delay pulse signal z is sent to the logical pulse generating circuit 3 and through the power supplying circuit 4, the conducting phase switching between the three-phase stator windings 11, 12 and 13 is operated in a successive manner. Thus, the motor is smoothly accelerated, resulting in obtaining a good starting characteristic. In the embodiment shown in FIG. 6, the clock frequencies to be supplied to the first and second counting circuits 41 and 42 are different from each other, but in this embodiment shown in FIG. 9, only one kind of clock frequency can be advantageously used.

In addition, in the pulse generating circuit shown in FIG. 9 as another embodiment of this invention, the clock signal to be inputted to the second counting circuit as the initial value is one half the frequency of the first counting circuit, but it may be of a fraction of an integer of that.

Figure 12:
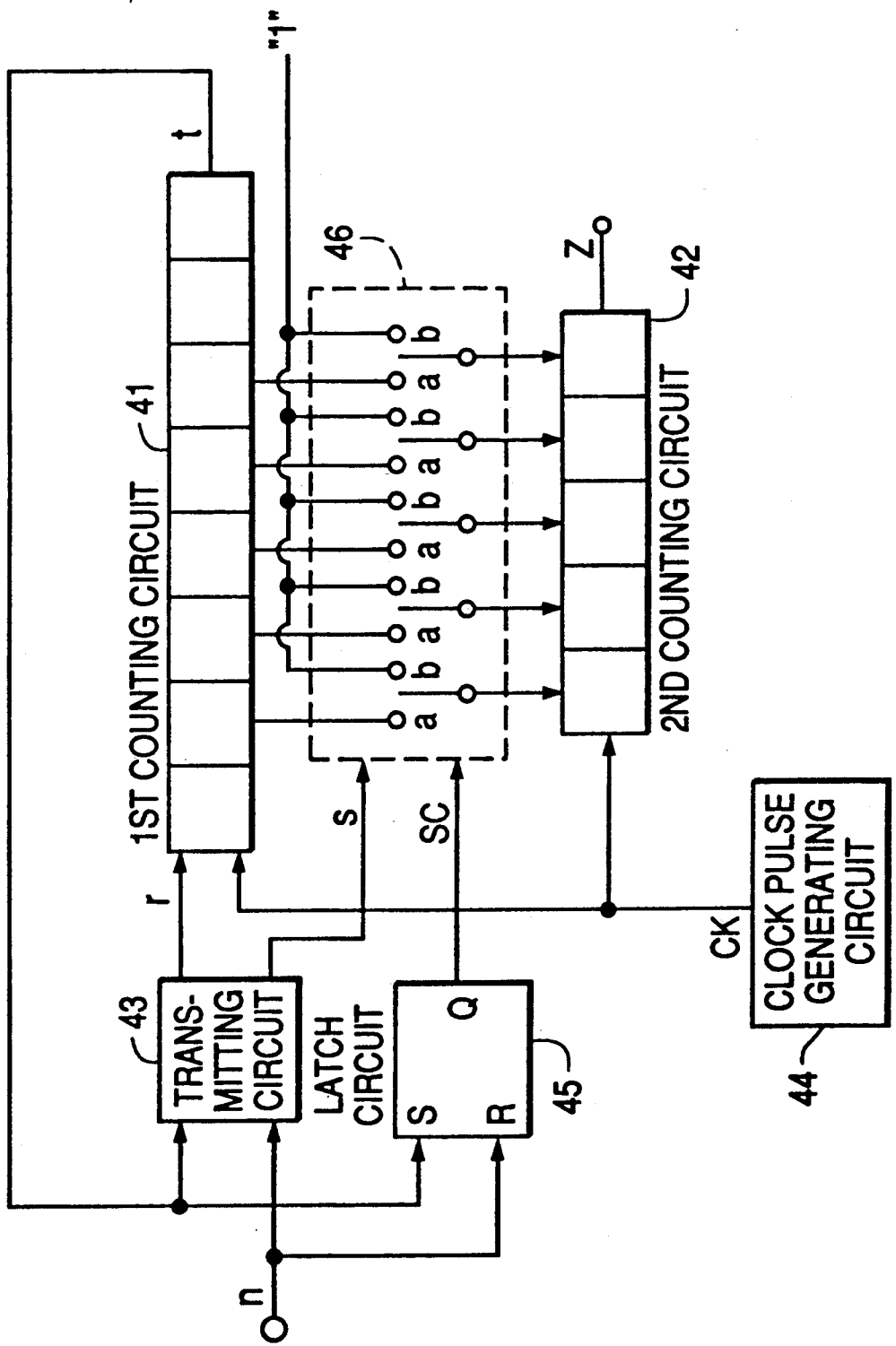
FIG. 12 is a block diagram of a pulse generating circuit showing further example of that shown in FIG. 1.
Figure 13:
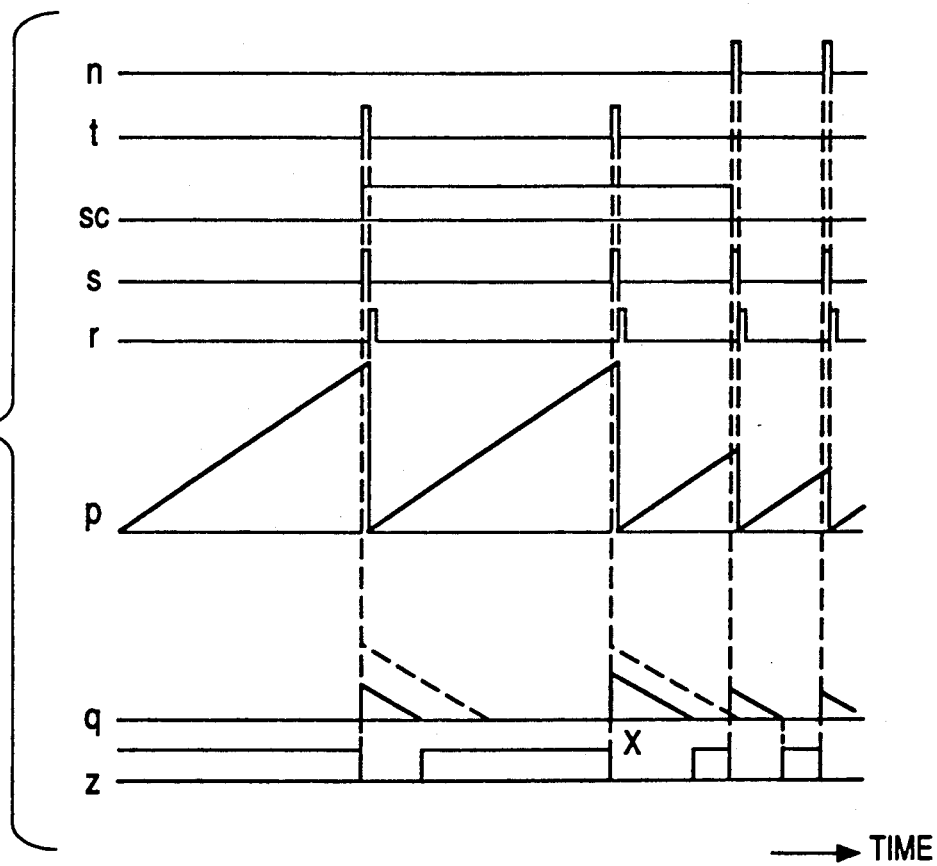
FIG. 13 is a diagram showing a signal waveform outputted from each member of the circuit shown in FIG. 12 when starting.

FIG. 12 is a block diagram of a pulse generating circuit showing another example of the pulse generating circuit 2 shown in FIG. 1. The waveform of each member of the circuit shown in FIG. 12 when a motor is to be started is shown in FIG. 13.

In addition, members having the same functions as those of members shown in FIGS. 6 and 9 have the same reference numerals and their explanations are omitted for the sake of eliminating duplication. Further in addition, the signal waveform to be outputted from each member when the motor is being normally rotated is omitted here because it is the same as that shown in FIG. 10.

In FIG. 12, a first counting circuit 41 is an eight-bit digital counter and a second counting circuit 42 is a five-bit digital counter. The first and second counting circuits 41 and 42 have the same clock pulse ck inputted. The first counting circuit 41 counts up the clock pulse ck and the second counting circuit 42 counts down the clock pulse ck. A switch transmitting circuit 46 is made of five switches; a transmission circuit 43 is connected by a load pulse s to a contact point a for a short period of time, and 5 bits excepting the least significant bit of the count value of the first counting circuit 41 are sent to the second counting circuit 42. Also, when the count value of the first counting circuit 41 is overflows, thereby outputting a carry flag signal t, the switch transmitting circuit 45 is connected to a contact point b for a short period of time and all the bits of the second counting circuit 42 are set to a "1".

The operation of the pulse generating circuit shown in FIG. 12 when the motor is being rotated normally will be explained below by referring to FIG. 10.

The count value p of the first counting circuit 41 is sent to the second counting circuit 42 at the timing of the load pulse s outputted from the transmitting circuit 43. In this case, however, bits excepting only the least significant bit of the count value of the first counting circuit 41 are sent to the second counting circuit 42, so that as shown in FIG. 10 q, the initial value to be fed to the second counting circuit 42 becomes a value one half the count value p of the first counting circuit 41. Thus, the second counting circuit 42 counts down the value of p/2 equivalent to one half value of the count value obtained by counting the frequency of the pulse train n with the clock pulse of ck, and the count value thus counted down becomes zero at the middle point of the pulse train n. As a result, the second counting circuit 42 outputs a delay pulse signal z as shown in FIG. 10. This means that the rising edges of the delay pulse signal z are delayed by 30° in terms of electrical angle from the zero-crossing points of the counter electromotive forces a, b and c.

Next, the operation of this pulse generating circuit when the motor is to be started will be explained below by referring to FIG. 13. When the motor is to be started, the counter electromotive force detecting circuit 1 does not output the pulse train n, so that the first counting circuit 41 continues to count up the clock pulse ck. As a result, the count value of the first counting circuit 41 is increased as shown in FIG. 13 q, and when the count value overflows, the first counting circuit 41 outputs the carry flag signal t to send it to the transmitting circuit 43 and the latch circuit 45. The transmission circuit 43 receives the signal t thus outputted and outputs the reset pulse r and load pulse s. The second counting circuit 42 has the initial value loaded by the load pulse s. In this case, however, suppose that the transmitting circuit 43 receives the pulse signal t and the value of p/2 (the upper 7 bits) equivalent to one half value of the count value of the first counting circuit 41 is sent directly to the second counting circuit 42 of a 7-bit counter as the initial value as shown by the dotted line in FIG. 13q. Then, as is clear from the waveform shown by the dotted line in FIG. 13q, such a case where the count value of the first counting circuit 41 is further sent to the second counting value 42 before the second counting circuit 42 counts down the value of p/2 and its count value becomes zero may be happen when starting. In such a case, the count value of the second counting circuit 42 does not become zero, so that the delay pulse signal z cannot be outputted. As a result, a pulse x as shown in FIG. 13 z cannot be generated. Therefore, the phase switching cannot be properly operated between the stator windings, so that smooth acceleration of the motor cannot be expected.

Accordingly, in case the motor is to be started, when the transmitting circuit 43 receives the signal t, the value of p/2 equivalent to one half the value of count value of the first counting circuit 41, that is, the upper 7 bits excepting the least significant bit of the count value of the first counting circuit 41, is not sent directly to the second counting circuit 42, but by connecting the switch transmitting circuit 46 to the contact point b for a short period of time during transmission, such a predetermined value as shown by the continuous line in FIG. 13q, which is smaller than the value of p/2 equivalent to one half the value of the count value of the first counting circuit 41, is sent to the second counting circuit 42. Namely, 5 bits, all of which area "1", sent to the second counting circuit 42 in this case. Thus, as already explained above, such a case that the count value of the first counting circuit 41 is further sent to the second counting circuit 42 before the count value of the circuit 42 becomes zero can be prevented from happening, and the count value of the second counting circuit 42 surely becomes zero thereby output the delay pulse signal z. Then, the second counting circuit 42 outputs the delay pulse signal z as shown in FIG. 13z in the same fashion as in case when the motor is being rotated normally. The pulse z thus outputted is sent to the logical pulse generating circuit 3, thus switching through the power supplying circuit 4 the conducting phases of stator windings 11, 12 and 13 in a successive manner. Thus, the motor can be smoothly accelerated, resulting in obtaining a good starting characteristic.

The first and second counting circuits 41 and 42 shown in FIG. 6 are different in clock frequency to be supplied from each other, but the first and second counting circuits 41 and 42 shown in FIG. 12 as this example can advantageously use one kind of clock signal.

In addition, the second counting circuit 42 shown in FIG. 12 advantageously has a smaller number of bits than that of the second counting circuit 42 shown in FIG. 9.

Further in addition, in the pulse generating circuit shown in FIG. 12, as the initial value of the second counting circuit when normally rotating the motor, a value one half the count value of the first counting circuit is selected, but it may be of a fraction of an integer of that.

Figure 14:
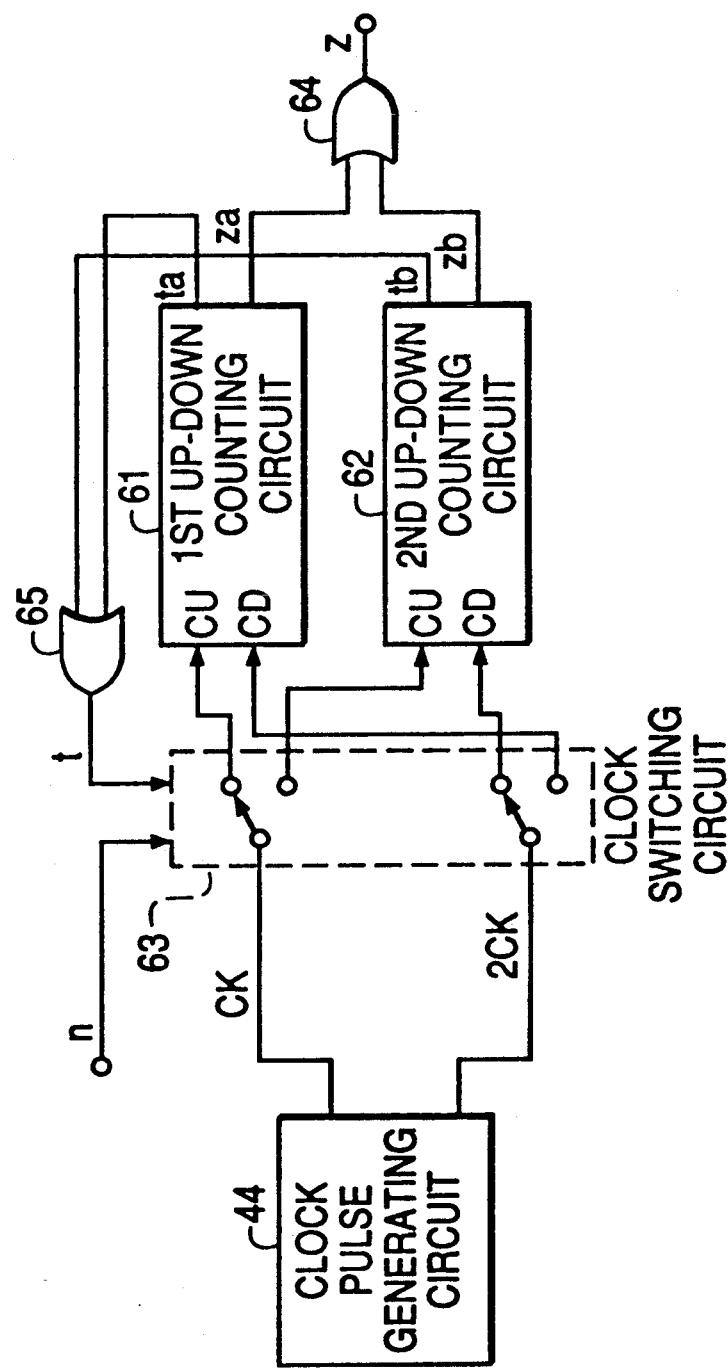
FIG. 14 is a block diagram of a pulse generating circuit showing still further example of that shown in FIG. 1.
Figure 15:
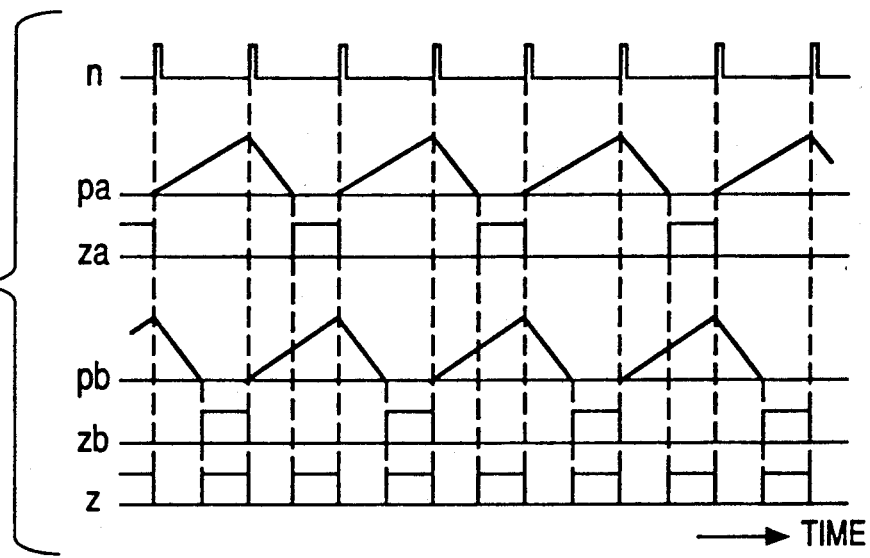
FIG. 15 is a diagram showing a signal waveform outputted from each member of the circuit shown in FIG. 14 when rotating stationarily.
Figure 16:
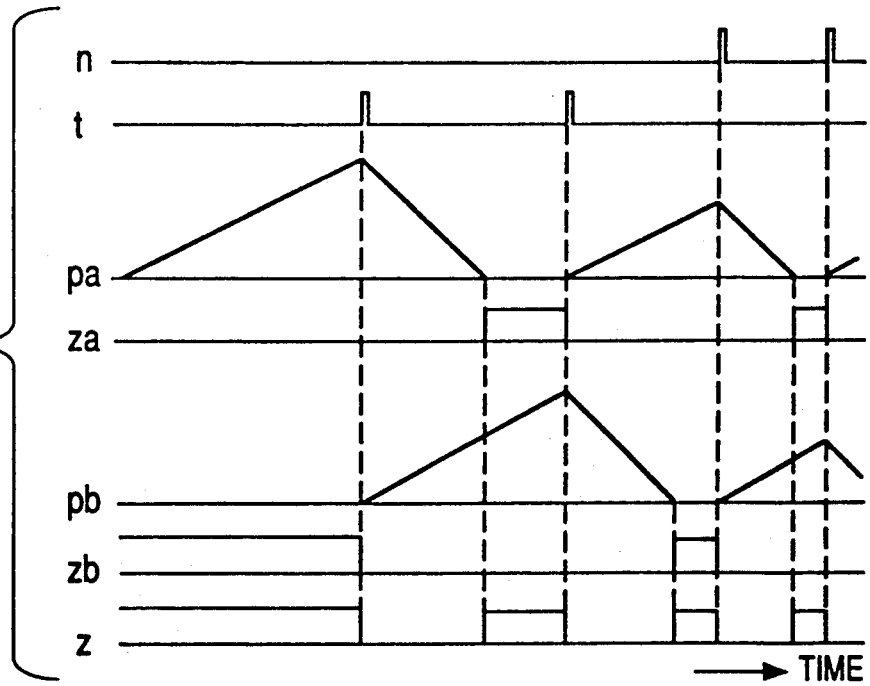
FIG. 16 is a diagram showing a signal waveform outputted from each member of the circuit shown in FIG. 14 when starting.

FIG. 14 is a block diagram of a pulse generating circuit showing still a further example of the pulse generating circuit 2 shown in FIG. 1. The waveform of each member thereof when the motor is being rotated normally is shown in FIG. 15 and that when it is to be started is shown in FIG. 16.

In FIG. 14, element 61 is a first up-down counting circuit and element 62 is a second up-down counting circuit. The first up-down counting circuit 61 and the second up-down counting circuit 62 each has a count up input CU and a count down input CD. In addition, the first and second up-down counting circuits 61 and 62 count up their inputted signals and when the count values are overflow, output carry flag signals ta and tb, and on the other hand, count down their inputted signals and when their count values respectively become zero, output zero flag signals za and zb, respectively. The two carry flag signals ta and tb are sent to an OR circuit 65 to output a signal t. A clock switching circuit 63 alternately operates to switch supplying two kinds of clock pulses, ck and 2ck (the clock frequency is twice as large as ck) outputted from the clock pulse generating circuit 44 between the count up input CU and the count down CD of each of the circuits 61 and 62 in response to the pulse n outputted from the counter electromotive force detecting circuit 1 and the signal t outputted from the OR circuit 65. Another OR circuit 64 receives the zero flag signals za and zb outputted from the respective first and second up-down counting circuits 61 and 62 thereby outputting a delay pulse signal z.

The operation of the pulse generating circuit shown in FIG. 14 when the permanent magnet rotor 27 is being normally rotated will be explained by referring to FIG. 15.

First, suppose that the switch of the clock switching circuit 63 is positioned as shown in FIG. 14. Then, the clock pulse ck is supplied to the count up input CU of the first up-down counting circuit 61, and the first up-down counting circuit 61 continues to count up the clock pulse ck until the pulse train n is inputted to the clock switching circuit 63. Next, when the pulse n is inputted to the clock switching circuit 63, the first up-down counting circuit 61 switches its operation to counting down. Also, the clock pulse supplied to the count down input CD of the up-down counting circuit 61 from the clock switching circuit 63 is of the value of 2ck, meaning that a clock having a clock frequency twice as large as the value of ck is inputted thereto. As a result, the count value obtained by counting up the frequency of the pulse train n is counted down with the clock pulse of 2ck, thus, the count value becomes zero at the middle point of the pulse train n. This is shown in FIG. 15pa. Therefore, the first up-down counting circuit 61 outputs a zero flag signal za as shown in FIG. 15. Similarly, the second up-down counting circuit 62 also repeats the up-down count operation as shown in FIG. 15pb thereby outputting a zero flag signal zb as shown in FIG. 15. Since the zero flag signals za and zb are alternately generated, the OR circuit 64 outputs a pulse signal as shown in FIG. 15z. The pulse generating circuit shown in FIG. 14 outputs a delay pulse signal z whose rising edges are delayed in phase by 30° in terms of electrical angle from the zero-crossing points of the counter electromotive forces a, b and c.

Next, the operation of the pulse generating circuit shown in FIG. 14 when starting the motor will be explained below by referring to FIG. 16.

First, suppose that the switch of the clock switching circuit 63 is positioned as shown in FIG. 14. The first up-down counting circuit 61 count up the clock pulse ck until the clock switching circuit 63 receives the pulse n outputted from the counter electromotive force detecting circuit 1. However, as the rotor is stationary, the counter electromotive force detecting circuit 1 does not output the pulse n. As a result, the count value of the first up-down counting circuit 61 is increased as shown in 16 pa, and when it is overflows, the first up-down counting circuit 61 outputs a carry flag signal ta to the clock switching circuit 63. Thus, the clock switching circuit 63 switches the first up-down counting up circuit 61 from the up-counting operation to the counting down operation in the same way as in the case when the motor is being rotated normally. In addition, since the clock of 2ck, is supplied thereto, that is, the clock frequency is twice as large as ck, the counted up count value is counted down with the clock pulse of 2ck, and then, the count value will become zero. This is shown in FIG. 16pa. As a result, the first up-down counting circuit 61 outputs a zero flag signal za as shown in FIG. 16. Similarly, the second up-down counting circuit 62 also repeats the up-down count operation as shown in FIG. 16pb thereby outputting a zero flag signal zb as shown in FIG. 16. As the zero flag signals za and zb are alternately generated, the OR circuit 64 outputs a pulse signal z as shown in FIG. 16. The pulse signal z shown in FIG. 16 is equivalent to the pseudo output pulse when starting the motor. Then, the pulse z is sent to the logical pulse generating circuit 3 and thorough the power supplying circuit 4, switches the conducting phases of three-phase stator windings 11, 12 and 13 in a successive manner. As a result, the motor is smoothly accelerated, resulting in obtaining good starting characteristic of the same.

In each of the pulse generating circuits shown in FIGS. 6, 9 and 12, the transmitting circuit for transmitting a count value of the first counting circuit to the second counting circuit is required to be used. However, the pulse generating circuit shown in FIG. 14 has no need to use such a transmitting circuit and the transmission of the count value as shown above can be advantageously effected only by switching the up and down count operations thereof using a clock switching circuit.

Figure 17:
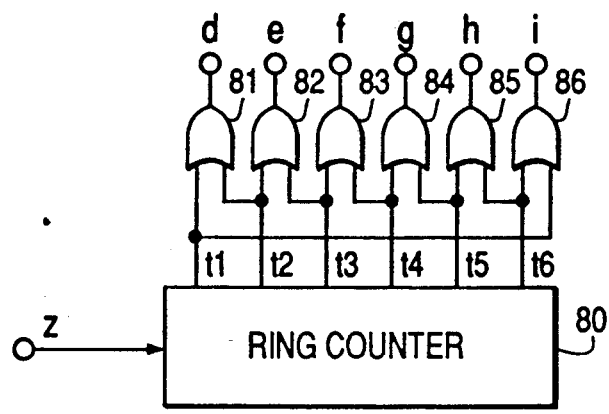
FIG. 17 is a block diagram of a logical pulse generating circuit shown in FIG. 1.

FIG. 17 is a block diagram of a logical pulse generating circuit 3 shown in FIG. 1. The signal waveform of each member thereof is shown in FIG. 18.

Figure 18:
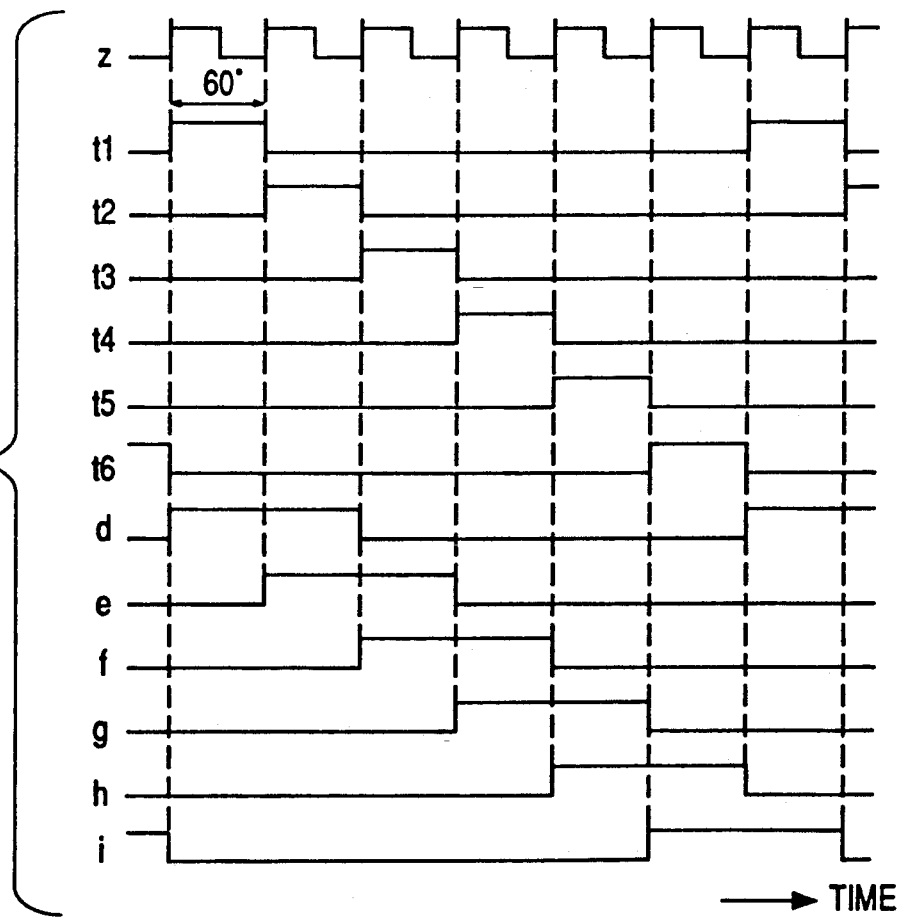
FIG. 18 is a diagram showing a signal waveform outputted from each member of the circuit shown in FIG. 17.

In FIG. 17, element 80 is a six-phase ring counter and receives a pulse signal z outputted from a pulse generating circuit 2 to output six-phase pulse signals $t_1, t_2, t_3, t_4, t_5$ and $t_6$ as shown in FIG. 18. The pulse width between these pulse signals is 60° in terms of electrical angle. Elements 81, 82, 83, 84, 85 and 86 are OR circuits and respectively receive the six-phase pulse signals $t_1, t_2, t_3, t_4, t_5$ and $t_6$ outputted from the ring counter 80 thereby output six-phase position signals d, e, f, g, h, and i as shown in FIG. 18. The pulse width between these position signals is 120° in terms of electrical angle. The six-phase pulse signals d, e, f, g, h and i each becomes a position signal of a permanent magnet rotor 27 and is sent to a power supplying circuit 4 shown in FIG. 1.

As is clear from the above descriptions, in a brushless DC motor in accordance with this invention, first of all, a counter electromotive force detecting circuit 1 detects zero-crossing points of the counter electromotive forces a, b and c respectively induced in the stator windings 11, 12 and 13 thereby convert them into a pulse n. The pulse n is converted thorough a pulse generating circuit 2 into a delay pulse z which is delayed by 30° in terms of electrical angle from the pulse n. A logical pulse generating circuit 3 receives the pulse n to generate six-phase position signals d, e, f, g, h and i. Finally, a power supplying circuit 4 supplies drive currents j, k and l as shown in FIG. 3 bidirectionally to the stator windings 11, 12 and 13 in a successive manner, resulting in the rotation of a permanent magnet rotor 27.

As a result, a brushless DC motor of this invention makes it possible to provide a full wave drive motor capable of bidirectionally supplying an electric current to each of stator windings without using a position sensor such as a Hall effect sensor.

In addition, in the pulse generating circuit shown in FIG. 14, the clock frequency of a signal inputted to one of the count up and count down input terminals is twice as large as the clock frequency of a signal inputted to the other of them, but it may be of an integer multiple of that.

Further in addition, a counter electromotive force detecting circuit 1 of this invention uses, as shown in FIG. 4, three resistors connected in common to detect an electric potential of the neutral point 0 of stator windings, however, it is unnecessary to say that a signal line can be directly connected to the neutral point of the stator windings of the motor for this purpose. Still further in addition, in the embodiments of this invention described above, a motor to be used is limited to a three-phase motor having stator windings of Y (star) connection, but it is not limited thereto, being capable of using a motor of any number of phases. Also, a brushless DC motor of this invention can be applied to a motor having the stator windings of a delta connection.

What is claimed is:
1. A brushless DC motor, comprising:
   a plurality of stator windings;
   a counter electromotive force detecting means for generating a pulse signal train in response to counter electromotive forces respectively induced in said plurality of stator windings;
   a pulse generating means for generating a delay pulse signal delayed by a time proportional or approximately proportional to a period of said pulse signal;
   a logical pulse generating means for generating a plurality of delay pulse signals in response to said delay pulse signal; and a power supplying means for receiving an output signal from said logical pulse generating means as a position signal of a rotor and for supplying electric power to said plurality of stator windings in response to said position signal;

wherein said pulse generating means comprises:

a first counter means for counting a period of said pulse signal train;

a transmitting means for transmitting a count value of said first counter means to a second counter means;

said second counter means to a second counter means;

said second counter means outputting a delay pulse signal delayed by a time proportional or approximately proportional to a period of said pulse signal train from said count value thus transmitted; and a clock pulse generating means for outputting a clock signal to said first and second counter means.

2. A brushless DC motor as claimed in claim 1, wherein a clock signal frequency to be inputted to said second counter means is different from that to be inputted to said first counter means.

3. A brushless DC motor as claimed in claim 1, wherein a clock signal frequency to be inputted to said second counter means is of an integer multiple of that to be inputted to said first counter means.

4. A brushless DC motor as claimed in claim 1, wherein a clock signal frequency to be inputted to said second counter means is twice that to be inputted to said first counter means.

5. A brushless DC motor as claimed in claim 1, wherein said transmitting means transmits a value of a fraction of an integer of a count value counted through said first counter means to said counter means.

6. A brushless DC motor as claimed in claim 1, wherein said transmitting means transmits a value which is one half a count value of said first counter means to said second counter means.

7. A brushless DC motor, comprising:

a plurality of stator windings;

a counter electromotive force detecting means for generating a pulse signal train in response to counter electromotive forces respectively induced in said plurality of stator windings;

a pulse generating means for generating a delay pulse signal delayed by a time proportional or approximately proportional to a period of said pulse signal;

a logical pulse generating circuit for generating a plurality of delay pulse singles in response to said delay pulse signal; and a power supplying means for receiving an output signal from said logical pulse generating means as a position signal of a rotor and for supplying electric power to said plurality of stator windings in response to said position signal;

wherein said pulse generating means comprises:

first and second up-down counter means in which a count up operation and a count down operation can be switched in response to a pulse signal train generated by said counter electromotive force detecting means and when one of said first and second up-down counter means is effecting count up operation, the other counter means is effecting a count down operation; and a clock generating means for outputting a clock signal to said first and second up-down counter means.

8. A brushless DC motor as claimed in claim 7, wherein said first and second up-down counter means each has a count up input terminal and a count down input terminal and a clock signal frequency to be inputted to the count up input terminal is different from that to be inputted up input terminal is different from that to be inputted to the count down input terminal.

9. A brushless DC motor as claimed in claim 7, wherein said first and second up-down counter means each has a count up input terminal and a count down input terminal and a clock signal frequency to be inputted to count input terminals of one of said first and second up-down counter means is of an integer multiple of that to be inputted to those of the other.

10. A brushless DC motor as claimed in claim 7, wherein said first and second counter means each has a count up input terminal and down-count input terminal and a clock signal frequency to be inputted to count input terminals of one of said first and second up-down counter means is twice that to be inputted to those of the other.

11. A brushless DC motor comprising:

a plurality of stator windings;

a counter electromotive force detecting means for generating a pulse signal train in response to electromotive forces respectively induced in said plurality of stator windings;

delay pulse generating means for generating a delay pulse signal delayed by a time proportional or approximately proportional to a period of said pulse signal train when the period of said pulse signal train is within a predetermined range and a pseudo output pulse signal when the period of said pulse signal train exceeds said predetermined range;

a logical pulse generating means for generating a plurality of pulse signals in response to said delay pulse signal and said pseudo pulse signal; and a power supplying means for receiving an output signal from said local pulse generating means as a position signal of a rotor and for supplying electric power to said plurality of stator windings in response to said position signal.

12. A brushless DC motor as claimed in claim 11, wherein said pulse generating means outputs a delay pulse signal delayed by a time 1/N (N is an integer) the period of said pulse signal train.

13. A brushless DC motor as claimed in claim 11, wherein said pulse generating means outputs a delay pulse signal delayed by a time one half the period of said pulse signal train.

14. A brushless DC motor comprising:

a plurality of stator windings;

a counter electromotive force detecting means for generating a pulse signal train in response to electromotive forces respectively induced in said plurality of stator windings;

a delay pulse generating means for generating a delay pulse signal delayed by a time proportional or approximately proportional to a period of said pulse signal train when the period of said pulse signal train is within a predetermined range and a pseudo output pulse signal when the period of said pulse signal train exceeds said predetermined range;

a logical pulse generating means for generating a plurality of pulse signals in response to said delay pulse signal and said pseudo pulse signal; and a power supplying means for receiving an output signal from said logical pulse generating means as a position signal of a rotor and for supplying electric power to said plurality of stator windings in response to said position signal;

wherein said pulse generating means comprises:

a first counter means for counting a period of said pulse signal train;

a transmitting means for transmitting a count value of said first counter to a second counter means;

said second counter means outputting a delay pulse signal delayed by a time proportional or approximately proportional to a period of said pulse signal train from said count value thus transmitted; and a clock pulse generating means for outputting a clock signal to said first and second counter means.

15. A brushless DC motor as claimed in claim 14, wherein said transmitting means transmits a different initial value to said second counter means in response to a count value of said first counter means.

16. A brushless DC motor as claimed in claim 14, wherein when a count value of said first counter means is within a predetermined range, said transmitting means transmits a value proportional or approximately proportional to the count value to said second counter means and when exceeding the predetermined range, said transmitting means transmits a constant value to said second counter means.

17. A brushless DC motor as claimed in claim 16, wherein when a count value of said first counter means is within a predetermined range, said transmitting means transmits a value of which is a fraction of an integer of the count value to said second counter means.

18. A brushless DC motor as claimed in claim 16, wherein when a count value of said first counter means is within a predetermined range, said transmitting means transmits a value one half the count value to said second counter means.

19. A brushless DC motor as claimed in claim 14, wherein a clock signal frequency to be inputted to said second counter means is different from that to be inputted to said first counter means.

20. A brushless DC motor as claimed in claim 14, wherein a clock signal frequency to be inputted to said, second counter means is a fraction of an integer that of a signal to be inputted to said first counter means.

21. A brushless DC motor as claimed in claim 14, wherein a clock signal frequency to be inputted to said second counter means is twice that of a signal to be inputted to said first counter means.

22. A brushless DC motor, comprising:

a plurality of stator windings;

a counter electromotive force detecting means for generating a pulse signal train in response to electromotive forces respectively induced in said plurality of stator windings;

a delay pulse generating means for generating a delay pulse signal delayed by a time proportional or approximately proportional to a period of said pulse signal train when the period of said pulse signal train is within a predetermined range and a pseudo output pulse signal when the period of said pulse signal train exceeds said predetermined range;

a logical pulse generating means for generating a plurality of pulse signals in response to said delay pulse signal and said pseudo pulse signal; and a power supplying means for receiving an output signal from said logical pulse generating means as a position signal of a rotor and for supplying electric power to said plurality of stator windings in response to said position signal;

wherein said pulse generating means comprises:

first and second up-down counter means each having a count up operation and a count down operation switched in response to a pulse generated through said counter electromotive force detecting means such that when one of said first and second counter means is effecting a count up operation, the other counter means is effecting a count down operation; and a clock generating means for outputting a clock signal to said first and second up-down counter means.

23. A brushless DC motor as claimed in claim 22, wherein said first and second up-down counter means each can be switched from the count up operation to the count down operation when its count value becomes a predetermined value.

24. A brushless DC motor as claimed in claim 22, wherein a clock signal frequency to be inputted to count input terminals of one of said first and second up-down counter means is different from that to be inputted to the terminals of the other of said first and second up-down counter means.

25. A brushless DC motor as claimed in claim 22, wherein a clock signal frequency to be inputted to count input terminals of one of said first and second up-down counter means is an integer multiple of that to be inputted to the terminals of the other of said first and second up-down counter means.

26. A brushless DC motor as claimed in claim 22, wherein a clock signal frequency to be inputted to count input terminals of one of said first and second up-down counter means is twice that to be inputted to the terminals of the other of said first and second up-down counter means.

* * * * *